April 11, 1961  J. L. JEANNERET  2,978,940
ARRANGEMENT FOR ACCURATELY POSITIONING A WORM-CONTROLLED
SLIDE IN A MACHINE TOOL
Filed Dec. 5, 1956  4 Sheets-Sheet 1

INVENTOR
JULES LOUIS JEANNERET
BY Irwin S. Thompson
ATTY.

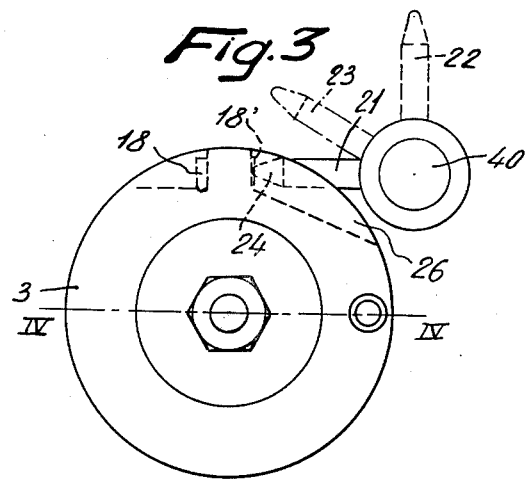
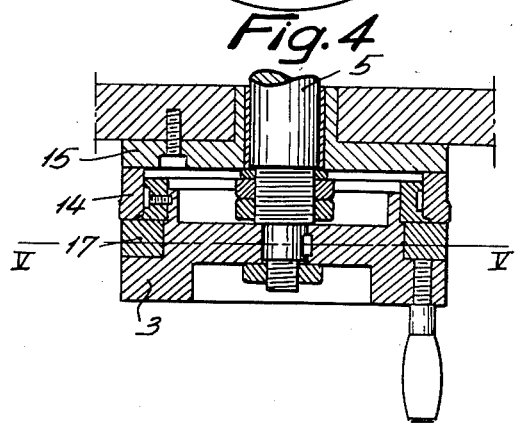
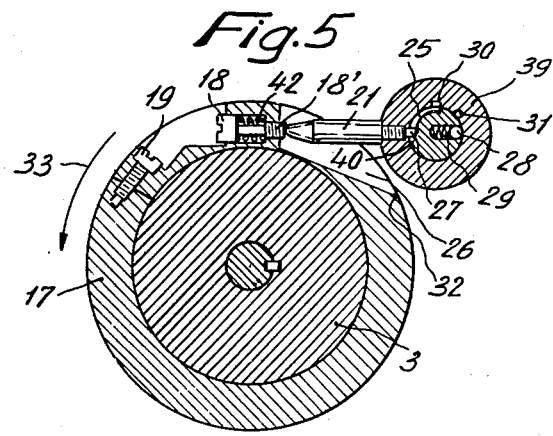
INVENTOR
JULES LOUIS JEANNERET
ATTY.

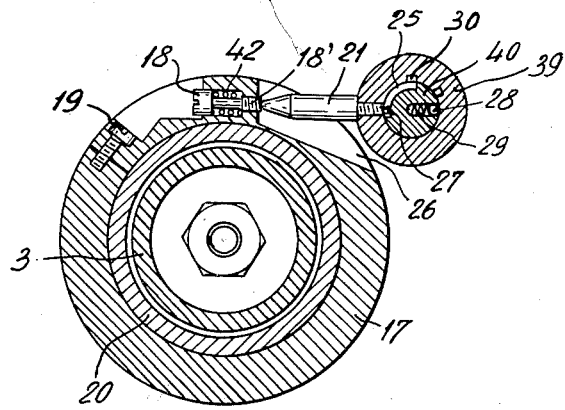
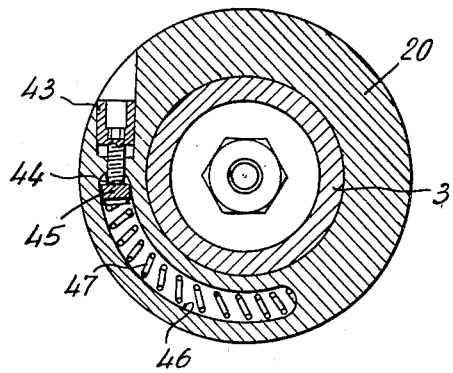
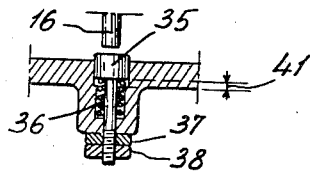

United States Patent Office
2,978,940
Patented Apr. 11, 1961

2,978,940
ARRANGEMENT FOR ACCURATELY POSITIONING A WORM-CONTROLLED SLIDE IN A MACHINE TOOL

Jules Louis Jeanneret, 13a 21 Rue Henri Gelin, Niort, France

Filed Dec. 5, 1956, Ser. No. 626,404

Claims priority, application France Dec. 30, 1955

3 Claims. (Cl. 82—24)

The tool-carrying or work-carrying slides of machine-tools should be positioned in a very accurate manner with a view to obtaining pieces of work which are also accurate.

More particularly, in a slide lathe, the transverse slide carrying the tool is controlled by a handwheel driving a worm and associated wth dividing means cooperating with a vernier. The workman sets the slide and the tool in position by using the dividing means and the vernier or else by resorting to a stop limiting the shifting of the slide as described in particular in my copending specification Ser. No. 450,203 of August 13, 1954. In both cases and for obtaining accurately finished parts within the prescribed allowances, the workman has to proceed with considerable care and sensitivity.

My present invention has for its object an arrangement for accurately positioning the worm-controlled slide of a machine tool in a manner such that even an unskilled workman may obtain speedily a correct and accurate positioning of such a tool-carrying or work-carrying slide and be capable thus of executing easily a perfectly accurate work.

To this end, the worm controlled by the handwheel for ensuring the drive of the slide is brought exactly in the position for which the tool or the work carried by said slide occupies the accurate desired position through the engagement of a rotary stop with an abutment rigid with a collar fitted in an angularly adjustable manner on the control worm.

I have illustrated by way of example in the accompanying drawings an embodiment of my invention applied to a slide lathe. In said drawings:

Fig. 3 is an elevational view of said improved arrangement fitted on the handwheel of Fig. 2.

Fig. 4 is an axial cross-section through line IV—IV of Fig. 3, of the handwheel carrying the arrangement according to my invention.

Fig. 5 is a vertical section of said arrangement through line V—V of Fig. 4, cooperating with the collapsible stop.

Fig. 8 is a vertical cross-section through line VI—VI of Fig. 7.

Fig. 9 is a vertical cross-section through line VII—VII of Fig. 7.

Fig. 10 is a cross-section of an auxiliary stop.

Figure 1:
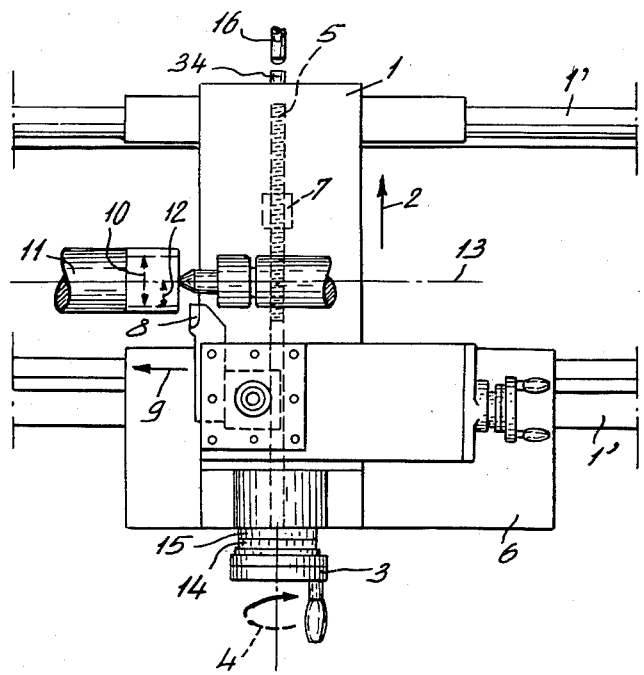
Fig. 1 is a diagrammatic view of the transverse slide mounted on the slide lathe.

As disclosed, my invention is illustrated by way of example as applied to a slide lathe. It is apparent from inspection of Fig. 1 that the slide lathe includes a longitudinal slide or saddle 6 moving along the slideways 1' and on which the transverse slide 1 is adapted to move transversely in the direction of the arrow 2 and in the opposite direction; said transverse slide carries the tool 8 adapted to machine the piece of work 11 so as to bring its diameter to the desired value illustrated at 10, by moving longitudinally together with the transverse slide and the saddle in the direction of the arrow 9. The shifting of the tool in the transverse direction is ensured by the rotary handwheel 3 revolving in the direction of the arrow 4 or in the opposite direction inside a bearing provided in the saddle 6, said handwheel being rigid with a worm 5 engaging a nut 7 rigid with the transverse slide 1 in a manner such that the rotation of the handwheel and of the worm 5 produces a corresponding rectilinear shifting of the transverse slide and of the tool in the transverse direction, the transverse slide moving in the direction of the arrow 2 when the workman turns the handwheel in the direction of the arrow 4.

The tool 8 rigid with the transverse slide 1 should of course be positioned in a perfectly accurate manner such that the longitudinal shifting of the saddle carrying the tool slide ensures the machining with the desired accuracy. On a slide lathe, the accuracy is all the more necessary that any error in the distance 12 between the tip of the tool 8 and the axis 13 of the piece of work to be machined 11 is doubled since what is to be considered is the diameter 10 of said piece of work 11.

Figure 2:
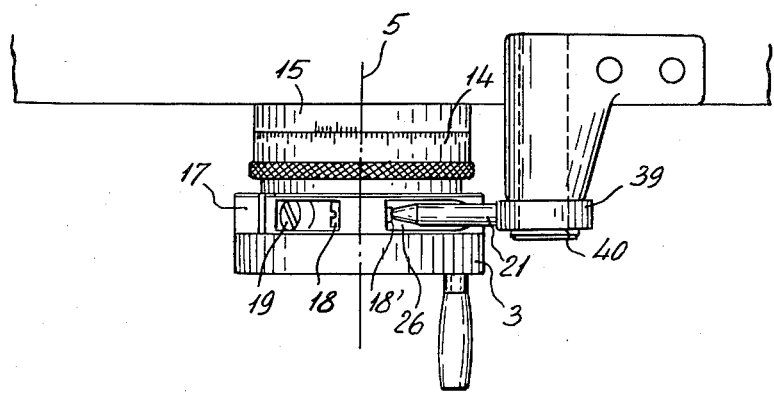
Fig. 2 is a view from above of the handwheel controlling the shifting of the transverse slide and of my improved arrangement associated therewith.
Figure 6:
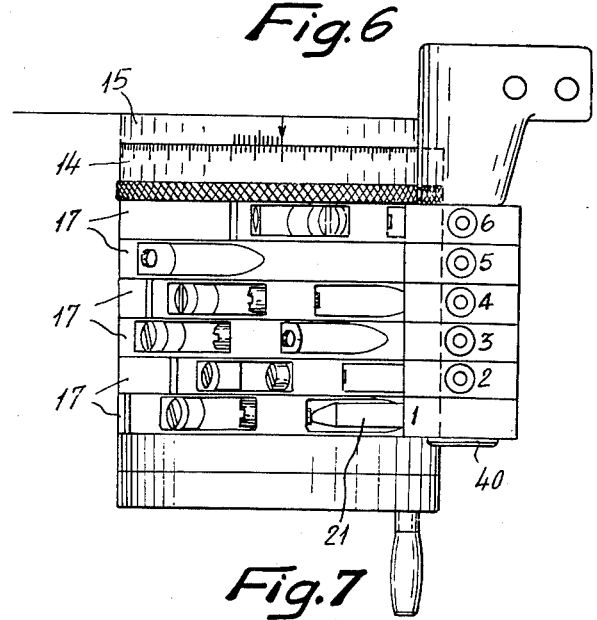
Fig. 6 is a modification viewed from above of the arrangement according to my invention, wherein the handwheel controlling the shifting of the transverse slide is associated with multiple stops which serve for defining selectively several accurate positionings of the tool.
Figure 7:
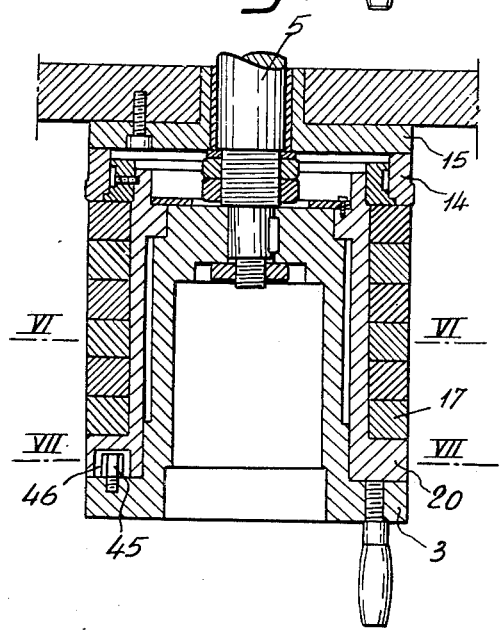
Fig. 7 is an axial cross-section of the arrangement according to Fig. 6 showing angularly adjustable collars fitted on the control worm through the agency of a common sleeve.

As disclosed hereinabove, the usual methods for the accurate positioning of the tool with reference to the rotary axis 13 of the work 11 are not generally both accurate and speedy. The workman may use the dividing means 14 and the vernier 15 provided respectively on the handwheel and on a support rigid with the saddle for obtaining a better accuracy, but this constrains the operator to be very attentive and highly responsive. It is also possible to resort to a stop such as 16 rigid with the saddle 6 and engageable by an abutment 34 rigid with the transverse slide 1, without this providing a sufficient accuracy. For this reason and according to my invention, I resort to at least one rotary stop cooperating with the handwheel 3 for limiting the angular displacement of the latter. This is obtained by means of a slotted collar 17 (Fig. 2) revolving freely round the handwheel 3 and adapted to be held fast after angular adjustment through the locking screw 19 as more particularly apparent from inspection of Figs. 4 and 5. The slotted collar 17 is provided with a recess 26 inside which is located a projection or an adjustable screw 18 the end 18' of which is adapted to abut against the rotary abutment 21. The latter revolves round a pivot 40 the axis of which is parallel with the axis of the handwheel 3. In order to machine pieces of work in mass production, it is sufficient to define through suitable means on a first piece of work the accurate position of the tool so that its diameter may remain constant for the further pieces of work within the required allowances. This being done, the slotted collar 17 is caused to turn over the handwheel 3 the position of which has thus been defined until the end 18' of the screw 18 engages the collapsible abutment 21. The slotted collar 17 is then locked in position by fastening the screw 19 connecting its ends as illustrated in Fig. 5.

In order to avoid any misadjustment, the rotation of the adjustable screw 18 is braked e.g. by the coil spring 42. In case of necessity, a micrometric adjustment may be performed for the screw 18 when the slotted collar 17 has been locked in position. Then, for each of the following pieces of work of the series to be turned from the bar, the workman has only to bring the end 18' of the adjusting screw 18 into contact with the rotary stop 21 so that the angular accurate position of the worm 5 may produce through the tool 8 an identical accuracy for each bearing machined on a piece of work.

The rotary stop 21 may occupy three positions illustrated in Fig. 3, to wit an inoperative position 22 when the workman does not use the adjusting arrangement described, an intermediate oblique position 23 occupied by said stop between two successive similar machining steps and lastly a turned down operative position 24 which serves for defining and limiting the angular rotation of the handwheel 3 and of the worm 5. Fig. 5 allows a better understanding of the fitting of said rotary abutment 21 round its pivot 40. The latter which is stationary and is provided with an arcuate peripheral groove 25 carries a rotary ring 39 on which the actual abutment 21 is secured and is held radially for instance through screwing.

On the other hand, the inner end 27 of the stop 21 moves freely inside the peripheral groove 25 and limits thus the pivoting of the stop 21 between the positions 22 and 24 defined by the ends of the groove 25. Furthermore, the inoperative positions 22 and 23 are defined by two grooves or notches 30 and 31 provided inside the rotary ring 39 and adapted to be engaged by a ball 28 subjected to the action of a spring 29 housed radially inside the pivot 40. Said ball 28 upon engaging one of the notches 30 or 31 holds elastically the abutment 21 in the corresponding position 22 or 23.

In Fig. 3, it is apparent that the rotary stop 21 in its turned down operative position 24 enters the recess 26 formed in the slotted collar 17. When the workman makes the tool 8 recede by rotating the handwheel 3 in the direction of the arrow 33 (Fig. 5), the outer edge 32 of the recess 26 raises the rotary stop 21 from its operative position 24 into its intermediate position 23. The workman returns again the rotary stop 21 from this intermediate position 23 into its operative position 24 each time it is necessary for him to position accurately the tool 8 for cuttng a bearing of an accurate diameter.

On the other hand, it is necessary to take into account the wear of the tip of the tool, which wear does not allow retaining for a long time a high accuracy. For this reason, there is provided according to my invention and with a view to compensating said wear an adjustment of the angular setting of the slotted collar 17 with reference to the handwheel 3 and therefore with reference to the transverse worm 5.

To this end, the screw 18 is also adjusted, the rotation of said screw producing the angular setting of the slotted collar 17 since the end 18′ of the screw 18 is brought into engagement with the rotary stop 21. The transverse shifting of the tool 8 thus obtained is read as a function of the micrometric angular displacement of the slotted collar 17 on the dividing means 14 and on the vernier 15 of a conventional type.

Figs. 6, 7, 8, 9 and 10 illustrate a modification which allows ensuring selectively a number of adjustments for the tool corresponding to different diameters to be machined on the same piece of work. It is sufficient for this purpose to fit in side by side relationship a number of collars 17 corresponding to the number of adjustments to be foreseen on a common elongated sleeve 20 rigidly secured to the handwheel 3 of the worm 5. In the case illustrated, it has been assumed that there were six independently revoluble collars 17. There is mounted, in register with each of said collars and on a common pivot 40, a rotary stop mounted independently on said pivot in the manner described with reference to Fig. 5, said collars being numbered in the case illustrated from 1 to 6. Any one of said stops may be lowered selectively into its operative position 24 so as to form a stop for the corresponding slotted collar 17.

It is furthermore possible to synchronize said abutment arrangements with the stops in the apparatus forming the object of the above mentioned specification Ser. No. 450,203.

It is sufficient in this case (Fig. 10) to substitute for the abutment 34 (Fig. 1) on the transverse slide 1 a piston 35 urged towards the stop 16 by a strong spring 36 while the two nuts 37 and 38 screwed over the threaded piston rod engage the slide and limit the clearance 4 between the piston 35 and the slide 1 and thereby the maximum shifting of the piston with reference to the slide carrying it. Thus, the rotation of the handwheel 3 controlling the slide is braked by the spring 36 at the moment at which the piston 35 arrives into contact with the stop 16. At this moment, the operator should lower the corresponding pivotal stop 21. Continuation of the rotation of the handwheel 3 compresses the spring 36 and reduces the clearance 41. When the end 18′ of the screw 18 of the slotted collar 17 arrives in contact with the rotary stop 21, the clearance 41 is reduced by about one half. This spring-urged piston associated with the spring 36 may in fact be used also on a lathe which is not provided with the apparatus forming the object of the above mentioned specification.

When the multiple arrangements forming the object of my invention are used on a lathe provided or not with the apparatus forming the object of the said specification, the operator selects out of the rotary stops 21 numbered from 1 to 6 those which he wishes to use for a predetermined work. He causes them to pivot from the raised position 22 into the intermediate position 23. He then only needs to shift them in succession from their intermediate position 23 into their actual operative position 24 when the piston 35 on the transverse slide 1 arrives in contact with the corresponding stop 16.

In order to compensate for the unavoidable wear of the tool, which wear in the case of multiple arrangements will affect the different diameters to be cut from the bar, it is possible to produce with reference to the handwheel 3 and to the transverse worm 5 a supplementary micrometric angular shifting of the sleeve 20 carrying the slotted collar 17. The angular shifting of the sleeve 20 bodily shifts the collars 17 with their stops to provide an extra movement of the tool-holder compensating for wear. To this end, a micrometric screw 43 is secured to the sleeve 20, the spherical end of which screw 44 engages a stud 45 rigid with the handwheel 3. An arcuate groove 46 formed within the thickness of the sleeve 20 allows a relative shifting of the stud 45 which is urged by spring 47 housed inside said groove against the spherical end 44 of the micrometric screw 43.

The perfect accuracy of the parts of which the inside or the outside is to show one or more bearings of various shapes may thus be obtained readily through the simple or multiple arrangements described hereinabove.

Obviously, my invention is capable of many modifications and improvements falling within the scope of the accompanying claims.

What I claim is:

1. In a machine-tool, an arrangement for the accurate positioning of a worm-controlled slide, comprising a handwheel actuating the slide-controlling worm, a sleeve coaxially carried by the handwheel, at least one collar locked in angularly adjustable position over the sleeve, said collar being provided with a broad recess bounded substantially by a plane extending along one half chord of the collar periphery and substantially radial plane extending between the inner end of said half chord and the outer periphery of the collar, a counterstop threadedly engaging the radial plane bounding the recess in said collar and projecting to an adjustable amount into the recess, a stationary spindle extending in parallelism with the axis of the sleeve and lying in proximity with the outer surface of the collar, at least one stop carried by the spindle in a plane permanently registering with the corresponding collar, said stop being adapted to occupy selectively at least one inoperative angular position extending entirely outside the outer periphery of the corresponding collar and an angular position within the recess in the corresponding collar to engage the counterstop in said recess upon rotation of the handwheel and worm urging the counterstop towards the stop.

2. In a machine-tool, an arrangement for the accurate positioning of a worm-controlled slide, comprising a handwheel actuating the slide-controlling worm, a sleeve coaxially carried by the handwheel, a plurality of collars locked in angularly adjustable positions over the sleeve, means for adjusting micrometrically the angular position of the sleeve with reference to the handwheel, each collar being provided with a broad recess bounded substantially by a plane extending along one half chord of the collar periphery and a substantially radial plane extending between the inner end of said half chord and the outer periphery of the collar, a counterstop threadedly engaging the radial plane bounding the recess in each collar and projecting to an adjustable amount into the recess, a stationary spindle extending in parallelism with the axis of the sleeve and lying in proximity with the outer surfaces of the collars, a plurality of stops carried by the spindle in planes permanently registering with the corresponding collars, each stop being adapted to occupy selectively at least one inoperative angular position extending entirely outside the outer periphery of the corresponding collar and an angular position within the recess in the corresponding collar to engage the counterstop in said recess upon rotation of the handwheel and worm urging the counterstop towards the stop.

3. In a machine-tool, an arrangement for the accurate positioning of a worm-controlled slide, comprising a handwheel actuating the slide-controlling worm, a sleeve coaxially carried by the handwheel, a plurality of collars locked in angularly adjustable positions over the sleeve, said sleeve being provided with an arcuate recess extending coaxially with the sleeve axis inside the body of the sleeve, a stud rigid with the handwheel and engaging said annular groove, a spring fitted in said groove between the stud and the end of the groove to urge said end of the groove in the sleeve away from the stud, a micrometric screw threadedly engaging the sleeve and engaging the surface of the stud facing away from the spring to adjust the angular location of the sleeve with reference to the stud, each collar being provided with a broad recess bounded substantially by a plane extending along one half chord of the collar periphery and a substantially radial plane extending between the inner end of said half chord and the outer periphery of the collar, a counterstop threadedly engaging the radial plane bounding the recess in each collar and projecting to an adjustable amount into the recess, a stationary spindle extending in parallelism with the axis of the sleeve and lying in proximity with the outer surfaces of the collars, a plurality of stops carried by the spindle in planes permanently registering with the corresponding collars, each stop being adapted to occupy selectively at least one inoperative angular position extending entirely outside the outer periphery of the corresponding collar and an angular position within the recess in the corresponding collar to engage the counterstop in said recess upon rotation of the handwheel and worm urging the counterstop towards the stop.

References Cited in the file of this patent

UNITED STATES PATENTS

| | | |
|---|---|---|
| 646,652 | Washington | Apr. 3, 1900 |
| 791,329 | Dodge | May 30, 1905 |
| 1,248,941 | Sosa | Dec. 4, 1917 |
| 1,756,646 | Judge et al. | Apr. 29, 1930 |
| 1,910,744 | Brinkman et al. | May 23, 1933 |
| 2,105,962 | Bickel | Jan. 18, 1938 |
| 2,362,275 | Jacobs | Nov. 7, 1944 |
| 2,403,581 | Casella | July 9, 1946 |
| 2,702,657 | Davis | Feb. 22, 1955 |
| 2,814,228 | Garrett | Nov. 26, 1957 |

FOREIGN PATENTS

| | | |
|---|---|---|
| 20,485 | Great Britain | 1908 |
| 737,592 | Great Britain | Sept. 28, 1955 |